United States Patent [19]
Groglio

[11] Patent Number: 5,649,718
[45] Date of Patent: Jul. 22, 1997

[54] UTILITY CART

[76] Inventor: Valerie Defede Groglio, 360 Forest Ave., Rye, N.Y. 10580

[21] Appl. No.: 695,205

[22] Filed: Aug. 1, 1996

[51] Int. Cl.[6] .................................................. B62B 3/02
[52] U.S. Cl. .................. 280/641; 280/640; 280/43.17; 280/47.34; 414/341; 414/498
[58] Field of Search .......................... 280/641, 38, 642, 280/640, 651, 47.34, 79.2, 47.38, 647, 650, 43.17, 658, DIG. 4; 414/401, 341, 572, 584, 498; 296/20

[56] References Cited

U.S. PATENT DOCUMENTS

| | | |
|---|---|---|
| 1,711,629 | 5/1929 | Wright . |
| 2,877,047 | 3/1959 | Weil . |
| 3,082,016 | 3/1963 | Pratt . |
| 3,083,978 | 4/1963 | Foster . |
| 3,223,429 | 12/1965 | Hastings . |
| 4,199,170 | 4/1980 | Hubner et al. .......................... 280/641 |
| 4,275,896 | 6/1981 | Eicher . |
| 4,369,985 | 1/1983 | Bourgraf et al. . |
| 4,560,096 | 12/1985 | Lucas et al. . |
| 4,767,148 | 8/1988 | Ferneau et al. . |
| 4,871,100 | 10/1989 | Posner . |
| 4,989,889 | 2/1991 | Server Perez . |
| 5,092,722 | 3/1992 | Reazer, III et al. . |
| 5,271,634 | 12/1993 | Walton . |
| 5,390,942 | 2/1995 | Schuster et al. . |
| 5,429,286 | 7/1995 | Foust . |
| 5,458,347 | 10/1995 | Chiv . |

FOREIGN PATENT DOCUMENTS

| | | |
|---|---|---|
| 286520 | 10/1988 | European Pat. Off. . |
| 2700150 | 7/1994 | France . |
| 2803003 | 7/1979 | Germany . |
| 4033179 | 8/1991 | Germany . |
| 482573 | 1/1970 | Switzerland . |
| 646685 | 11/1950 | United Kingdom . |
| 2135942 | 9/1984 | United Kingdom . |
| 2275895 | 9/1994 | United Kingdom . |

*Primary Examiner*—Kevin Hurley
*Assistant Examiner*—Avraham Lerner
*Attorney, Agent, or Firm*—Richard C. Litman

[57] ABSTRACT

A wheeled utility cart includes a rigid rectangular basket component formed of molded plastic or a wire basket weave configuration. The wheels are relatively large, to permit use of the cart on rough, soft, and/or uneven surfaces, unlike the conventional small diameter casters provided on shopping carts. The wheels support the cart at a convenient height and the front and rear wheels are independently and automatically retractable, to permit the cart to be inserted into the back of a motor vehicle, such as a van, station wagon, or sport utility vehicle having a back door or gate. Lockable brakes are also provided for at least the rear wheels, to prevent the cart from rolling on a slope. The brake operation is by means of a high mounted lever, to preclude operation or disengagement by small children. A track is provided beneath the cart, which engages a mating track installed in the rear floor of the vehicle. The cart may thus be securely but removably anchored within the vehicle, for transport from store to home or other destinations as desired. Removable child seating and inner liner, as well as a cover which may be secured over the basket, are also provided for further utility. Thus, the cart may be loaded into the owner's vehicle, transported to the store or other area, used by the owner for shopping, and loaded back into the vehicle for transport back home or to another destination as desired, by the retractable and extendible wheel mechanism.

20 Claims, 9 Drawing Sheets

UTILITY CART

BACKGROUND OF THE INVENTION

1. Field of the Invention

The present invention relates generally to hand propelled wheeled carts and the like, and more specifically to a cart adapted for removable insertion into a motor vehicle having a rear access door, such as a small van, station wagon, or sport utility vehicle. The present cart includes four wheels which are automatically retracted when the cart contacts the rear of the vehicle, in order to allow the cart to slide in and out of the vehicle on a cooperating track installed therein. Additional features, such as a removable insert, baby seat(s), and closable cover, may be provided in addition to the basic cart.

2. Description of the Prior Art

Various hand operated carts and the like have been developed for both general and special purposes, since the invention of the wheel. An example of such is the shopping cart, which was developed with the advent of the supermarket. With the relatively large store area and vast number of different products and articles available, such carts became virtually a necessity for supermarket shoppers and have largely displaced the use of the earlier standard shopping bag or basket, at least for larger shopping purchases.

While the use of such carts has spread to many other types of commercial establishments, they are all quite similar, in that they are generally formed in a relatively open wire basket configuration with a transverse rear handle and four relatively small diameter wheels. The small diameter wheels preclude, or at least make difficult, travel over any but the smoothest and most level of surfaces, such as the hard floor normally provided in large store. Moreover, such carts are extremely limited in their use, as the non-retractable legs generally preclude their insertion in any but the largest of vehicles. As such carts are generally the property of the store, there is no intent that they be removed from the area of the store and that they have a wider range of use.

However, this limits the shopper to use of the car only in and near the store. Goods may be carried in the cart through the checkout line, and perhaps to the curb where they must then be loaded into the vehicle by hand. When the shopper returns home with the groceries and/or other goods, they must then be carried by hand from the vehicle into the home for stocking in the refrigerator, freezer, cupboard, etc., as appropriate.

Accordingly, it will be seen that a cart which remains the property of the shopper, and which is adapted for secure attachment within a motor vehicle, would facilitate considerably the purchase and delivery of groceries and other goods. Such a cart must be provided with retractable wheels, in order to provide for compact carriage within the rear cargo space of the typical utility vehicle, such as a minivan, station wagon, etc. Additional features are also desirable to provide greater utility and safety for the cart, such as wheel brakes and a complementary track arrangement within the rear of the vehicle, which the bottom of the cart engages to provide secure attachment of the cart within the motor vehicle during movement of the vehicle. The automatic folding and extension of the wheels of the cart, when the cart contacts the motor vehicle, is also desirable. Additional features, such as large diameter wheels to facilitate travel over soft, rough, or uneven terrain, may also be provided, to provide even greater versatility for the present cart. Removable seating for babies or small children may also be provided, for use when the cart is being propelled by hand. A top closure and removable insert may also be provided, for greater security and versatility. A review of the prior art of which the present inventor is aware, and its differences and distinctions from the present utility cart, is provided below.

U.S. Pat. No. 1,711,629 issued on May 7, 1929 to Robert L. Wright describes a Land, Water, And Air Vehicle, which structure is directed primarily to a complex motorized retraction system for the wheels. The wheels are drawn vertically upwardly by a rack and pinion system, and a complex mechanism of shafts, racks, and pinion gears is used. The device is sufficiently massive that some other form of propulsion must be provided, as evidenced by the draw tree provided for a team of draft animals at the front of the vehicle. No means is disclosed for securing the device within another vehicle, as provided by the present invention.

U.S. Pat. No. 2,877,047 issued on Mar. 10, 1959 to Burt Weil describes a Stretcher Having Retractable Legs, having two relatively large diameter fixed wheels at the forwardmost end and an additional four small casters which are provided below a folding pantograph type structure. The present invention provides four relatively large diameter wheels therebeneath, enabling the cart to be rolled easily over relatively rough or uneven terrain. The Weil casters would tend to dig in to such soft or rough terrain. While Weil does provide two large diameter wheels, these are only used to roll the gurney into and out of a vehicle, unlike the track arrangement provided for the present cart. Weil makes no disclosure of any means of firmly securing his stretcher within a vehicle, as provided by the present invention. Moreover, the simultaneous retraction of the four casters of the Weil stretcher, would result in the aft end of the stretcher requiring support by a person. The present retraction system provides for the independent retraction and extension of the forward and rearward wheels, so the rear of the cart is supported by its wheels when only the front portion is in the vehicle. Weil does not disclose any closure means, supplemental inserts, child seating, or brakes for his stretcher, all of which are provided by the present cart.

U.S. Pat. No. 3,082,016 issued on Mar. 19, 1963 to William D. Pratt describes an Auto Cart having a retractable undercarriage with four small casters extending therefrom. The casters all retract simultaneously due to a scissors type mechanism for the undercarriage. Two more small wheels are provided at the front of the cart, which must be placed upon another surface to cause the arm to which they are attached to release the lock for the main casters, to allow them to retract. A user of the Pratt cart must still support the rear of the cart, as all four wheels retract simultaneously. No brakes, child seat, closable cover, or means providing for the positive securing of the cart within the vehicle, are provided by Pratt, whereas these features and others are provided by the present utility cart.

U.S. Pat. No. 3,083,978 issued on Apr. 2, 1963 to Allan D. Foster describes a Cart Having A Removable Load Carrier, which cart is adapted for use with a specially configured supermarket checkout conveyor. A removable sling type carrier forms the floor and forward and rearward end walls of the cart, and is supported by the side walls of the cart. The cart is wheeled into position at the end of the conveyor, and the sling is detached from the cart and automatically carried onto the conveyor, along with any goods therein. The cart is wheeled to the delivery end of the conveyor, and the sling is deposited back into the cart. The apparatus does serve to automate the checkout procedure, but does nothing to provide for the removable installation of the cart within a vehicle, as provided by the present invention. The Foster cart wheels are relatively small and non-retractable, as Foster does not anticipate the use of his cart much outside the smooth surface of the store area. Foster is silent regarding brakes, wheel retraction, attachment means within a vehicle, child seats, etc., all of which are provided by the present utility cart.

U.S. Pat. No. 3,223,429 issued on Dec. 14, 1965 to Robert L. Hastings describes a Foldable Utility Cart having a total of six wheels. Two large wheels provide the primary support, with two casters supporting the end adjacent the handle. The problem with small casters has been discussed further above. In addition, two more wheels are provided at the forward end, to support that end when the cart is wheeled up to another surface for loading thereon. The main wheel retraction means is operated by the user of the cart releasing a handle, with the rear support casters being retracted by folding a brace beneath the cart. No track means is disclosed to attach the cart securely within a vehicle, as provided by the present cart. The present retraction mechanism is actuated completely automatically, with the user of the present cart needing to perform no further operation than wheeling the cart to the back of the vehicle and contacting the vehicle with the front of the cart. Moreover, Hastings is silent regarding various other features (baby seats, etc.) provided by the present cart.

U.S. Pat. No. 4,275,896 issued on Jun. 30, 1981 to Josef Eicher describes a Safety Mechanism For A Carriage Insertable into The Load Space Of A Vehicle. The carriage includes only two main wheels; the difficulty of supporting such a cart having only two wheels has been noted further above. The wheel struts are similar to those of the present invention. However, levers must be actuated manually to disengage the down locks for the struts, to allow the wheels to fold. Eicher makes no provision for automated release of the down lock pins, as provided by the present invention. In fact, the automated mechanism of the Eicher cart, teaches away from the present cart wheel retraction mechanism, by providing an automated means for preventing the operation of the manual retraction levers. Weight must be resting on the forward end of the cart, to cause a small caster to pivot about an attachment point and to pull a release cable, thereby allowing the down lock to be released manually by the levers on the handles. As the present system does not use manual handles to release the retraction down locks, no such automated safety device is required. As in the case of most of the other prior art discussed above, Eicher does not provide for various other features of the present invention, such as child seats, brakes, removable inserts, etc.

U.S. Pat. No. 4,369,985 issued on Jan. 25, 1983 to Elroy E. Bourgraf et al. describes a One Man Cart For Articles, including a total of six small diameter wheels. Two of the wheels are forwardly positioned to rest on the floor of a vehicle during the loading and unloading of the cart therefrom, with the remaining wheel structure being foldable. A single lever must be manually released to allow the forward wheels to fold rearwardly, and the same lever further moved to release the locking braces for the rear wheels. No automatic retraction is disclosed by Bourgraf et al., as is provided by the present cart. Bourgraf et al. further do not provide any means of positively locking the cart to the vehicle floor, nor any brakes, child seating, attachable and removable enclosure, or various other features provided by the present utility cart.

U.S. Pat. No. 4,560,096 issued on Dec. 24, 1985 to Peter Lucas et al. describes a Detachable Bag Intended Particularly For Use With A Mobile Container. The bags are flexible, fabric shopping bags, and are adapted to be placed removably within a shopping cart or the like. The present utility cart may make use of a similar removable insert, but the present insert is secured about its entire periphery within the cart, for security and to prevent spillage therefrom. The cart described with the Lucas et al. bags is conventional, and none of the features of the present utility cart are disclosed in the Lucas et al. patent.

U.S. Pat. No. 4,767,148 issued on Aug. 30, 1988 to Richard H. Ferneau et al. describes a Multiple Level Roll-In Cot, comprising a tubular metal frame having telescoping, generally diagonal supporting crossmembers. The distal ends of the crossmembers each have a small diameter wheel extending therefrom, with the forward and aft wheels on each side being tied together by another telescoping strut. The arrangement provides exceptional versatility for height and angular adjustment, but the connection between front and rear wheels results in the rearward portion of the stretcher frame, and any load thereon, requiring support by a person as the stretcher is loaded and unloaded from a vehicle. No means is provided for the securing of a container to the stretcher, nor for closing the container, supplemental child seats, brakes, etc., which features are a part of the present utility cart.

U.S. Pat. No. 4,871,100 issued on Oct. 3, 1989 to Brian Posner describes a Shopping Bag having a generally rectangular configuration with a rigid floor and opposite upper sides. The sides are adapted to hook over the sides of a shopping cart. The foldable remaining sides enable the bag to be folded flat. While the present cart may make use of a removable insert, the insert has a configuration which is substantially different from that disclosed by Posner. Posner makes no provision for further utility of the cart, other than its customary use in a grocery store, supermarket, or the like, whereas the present cart provides for secure carriage in the back of a vehicle and numerous other features.

U.S. Pat. No. 4,989,889 issued on Feb. 5, 1991 to Juan Server Perez describes a Foldable Chart (sic) For Shopping, comprising a two wheeled dolly with the wheels folding laterally inwardly. The wheels are restricted to a small diameter, as they reside beneath most of the structure of the cart. No rigid basket or enclosure is provided, nor is any means of anchoring the device in its unfolded state within a vehicle, any child seats, brakes, etc., as provided by the present utility cart.

U.S. Pat. No. 5,092,722 issued on Mar. 3, 1992 to George M. Reazer, III et al. describes an Automatically Adaptable Fastening System For Wheeled Cots And Similar Devices, providing a track for the positive anchoring of an ambulance gurney or the like within a vehicle. The present utility cart also uses a track, but the present track means is considerably simpler, as only a single retaining latch is required. The Reazer, III et al. track is quite complex, as multiple latches are required for different stretcher configurations, and the device is adapted for a standard stretcher fitting. Conventional stretchers or gurneys roll on their retracted wheels, or on a supplementary set of rollers, rather than on bearings within the track. The present cart uses relatively large wheels which are retracted above the vehicle floor for clearance, and uses roller bearings or the like within the walls of a smooth, continuous track. Reazer, III et al. are silent regarding the configuration of the cot or the like to which their track is adapted; no disclosure is made of any form of utility cart, as provided by the present invention.

U.S. Pat. No. 5,271,634 issued on Dec. 21, 1993 to Sharon A. Walton describes a Method Pot Covering Shopping Carts, comprising a spring loaded retractable sheet which rolls onto a removable roller. The roller is hooked to the wire frame at one end of the cart, and the opposite end of the retractable sheet is hooked to the opposite end of the cart. The device is not adaptable to the present utility cart, as the relatively thick padded peripheral structure thereof precludes the use of hooks thereon to attach the device. Moreover, the present cart may include a permanently attached cover, which is completely closable about all sides, unlike the Walton device.

U.S. Pat. No. 5,390,942 issued on Feb. 21, 1995 to Mary R. Schuster et al. describes a Brake Assembly For Shopping Carts, comprising a pair of tire engaging shoes which are rigidly connected to a lower horizontal crossmember which is fastened to the frame. While the present utility cart may use brakes operating on the principle of frictional engagement with the tires, the Schuster et al. system is not adaptable to the present cart, due to the retraction of the wheels of the present cart; a cable system must be used. Moreover, the operation of the Schuster et al. system is by means of a very low pedal mounted on the crossmember, which is only slightly above the small diameter cart wheels. This makes it easily accessible to small children. The present brake system is operated by a separate lever adjacent the high mounted handlebar of the cart, thereby placing the brake actuation (and release) out of reach of small children.

U.S. Pat. No. 5,429,286 issued on Jul. 4, 1995 to Victor K. Foust describes a Cart Securing Apparatus, comprising a forward stop which engages the front axle of the cart and a rearwardly disposed clamp which secures to a rearward lateral support crossmember of the cart. Accordingly, the cart must be specially adapted for use with the Foust apparatus, with only two forwardly disposed wheels and no rear wheels, unlike the present cart. The Foust apparatus would not work with the present utility cart, with its four retractable wheels and lack of any lower lateral crossmembers for the Foust apparatus to engage.

U.S. Pat. No. 5,458,347 issued on Oct. 17, 1995 to Lim Chiv describes a Bumper Arrangement For Nestable Carts, comprising a pair of generally vertical metal reinforcement rods in the rear panel of the carts and a mating pair of metal bumpers in the upper edge of the forward panels. These so-called bumpers are not intended to absorb shock, but rather to reduce wear and tear on the plastic structure of the forward and aft panels of the cart. The present cart may include a bumper, but the present bumper is generally horizontally disposed about the entire upper rim of the cart, and is padded to reduce damage or injury to objects or persons which might be struck by the cart.

British Patent Publication No. 646,685 to Rudolph Werlen and published on Nov. 29, 1950 describes Improvements In Or Relating To Bags, comprising a rigid, folding frame having a folding bag thereover. The structure resembles the foldable cart of the Server Perez U.S. patent discussed further above.

Swiss Patent Publication No. 482,573 to Andreas Hofman Metallwarenfabrik and published on Jan. 30, 1970 illustrates a supplementary basket or container which is removably attachable to the horizontal framework of a baby carriage or the like. The device includes longitudinal, parallel rod members which insert into the longitudinal tubular wheel support structure of the carriage. No means for covering or enclosing the basket, securing the carriage within a vehicle, folding the wheels, brakes for the wheels, etc. appears in the Swiss patent.

German Patent Publication No. 2,803,003 to Otto Reichelt Gmbh and published on Jul. 26, 1979 illustrates a shopping cart rear wheel steering lock mechanism, which locks the rear wheels in a straight alignment when the cart is free from other carts, but which unlocks the rear wheel alignment to allow the rear wheels to turn when the cart is interlocked with another cart for storage. The steerable rear wheels of the plurality of carts, along with their standard front steering, permits a person to maneuver the array of carts much more easily. However, no braking or retraction mechanism is disclosed, as provided by the present utility cart.

British Patent Publication No. 2,135,942 to Christopher T. S. Williams and published on Sep. 12, 1984 describes A Folding Shopping Trolley, resembling a low shopping cart with a fabric container permanently installed on the collapsible frame. Additional removable inserts are provided. No retraction of the wheels, brakes, child seating, or means providing for the positive securing of the cart within a vehicle, is provided.

European Patent Publication No. 286,520 to Guy Lemerre and published on Oct. 10, 1988 illustrates a folding shopping trolley (cart), in which the sides of the rectangular basket are hinged to allow them to fold flat, unlike the rigid construction of the present cart. The Lemerre cart also has a wheel retraction system, but the entire undercarriage folds simultaneously. The disadvantages of this type of mechanism have been noted further above. No means for securing the cart within a vehicle, provision for child seating, brakes, removable inserts, etc., are disclosed.

German Patent Publication No. 4,033,179 to Hans-Andreas Fein and published on Aug. 14, 1991 illustrates a portable stackable container which essentially comprises a rectangular box with an open top. The box is adaptable for carriage on a wheeled cart frame, but there is no apparent provision for placing the entire wheeled cart into a vehicle, nor for folding or retracting the cart wheels to allow for such placement. Instead, the box must be removed from the cart frame for placement of the box in the vehicle, which leaves the problem of handling the box at the ultimate destination, where the cart is not available. The present invention solves this problem, with its retractable undercarriage and track means enabling the entire cart to be removably secured within a motor vehicle.

French Patent Publication No. 2,700,150 to Jean-Louis Crocy and published on Jul. 8, 1994 illustrates a trolley (cart) which is foldable vertically and horizontally, and includes a detachable basket(s). No specific, separate retraction mechanism providing for the independent retraction of the front and rear wheel assemblies is apparent. Rather, the entire frame, including the undercarriage with its small casters, folds as a unit. No means is apparent for removably anchoring the cart within a motor vehicle, as provided by the present invention, nor is any disclosure apparent of child seating, covers for the basket(s), wheel brakes, etc., as provided by the present utility cart.

Finally, British Patent Publication No. 2,275,895 to Clares Equipment Limited and published on Sep. 14, 1994 describes A Shopping Trolley, generally similar to conventional shopping carts. However, a pair of side by side, rearwardly facing baby seats are provided toward the back of the cart, with a partition about two thirds of the way toward the back of the cart providing support for the seats. The rear third of the cart is accessible through the back wall of the cart. While the device provides more comfortable seating for up to two infants or very small children, it does not provide any means of retracting the wheels for insertion of the cart into a vehicle, nor any means to anchor the cart removably in a vehicle, as provided by the present utility cart.

None of the above inventions and patents, taken either singly or in combination, is seen to describe the instant invention as claimed.

SUMMARY OF THE INVENTION

Accordingly, it is a principal object of the invention to provide an improved utility cart which includes a retractable undercarriage and track means, enabling the cart to be wheeled to the back of a motor vehicle having a rear door or gate and removably anchored within the vehicle for transport as desired.

It is another object of the invention to provide an improved utility cart which vehicle anchoring means may include lateral as well as longitudinal insertion into the vehicle.

It is a further object of the invention to provide an improved utility cart which utilizes relatively large wheels, providing for travel of the cart over soft, rough, and uneven terrain.

Another of the objects of the invention is to provide ann improved utility cart which includes lockable wheel brakes to secure the cart on a slope as desired, which brakes are operated by a high mounted control to preclude activation or release by a small. child.

An additional object of the invention is to provide an improved utility cart which may include removable seating for one or two infants or small children.

Yet another object of the invention is to provide an improved utility cart which may include a removable internal liner which secures to the cart completely about its periphery, to provide security and to preclude leakage or spillage about the edge thereof.

Still another object of the invention is to provide an improved utility cart which may include a flexible, foldable cover and locking means therefor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
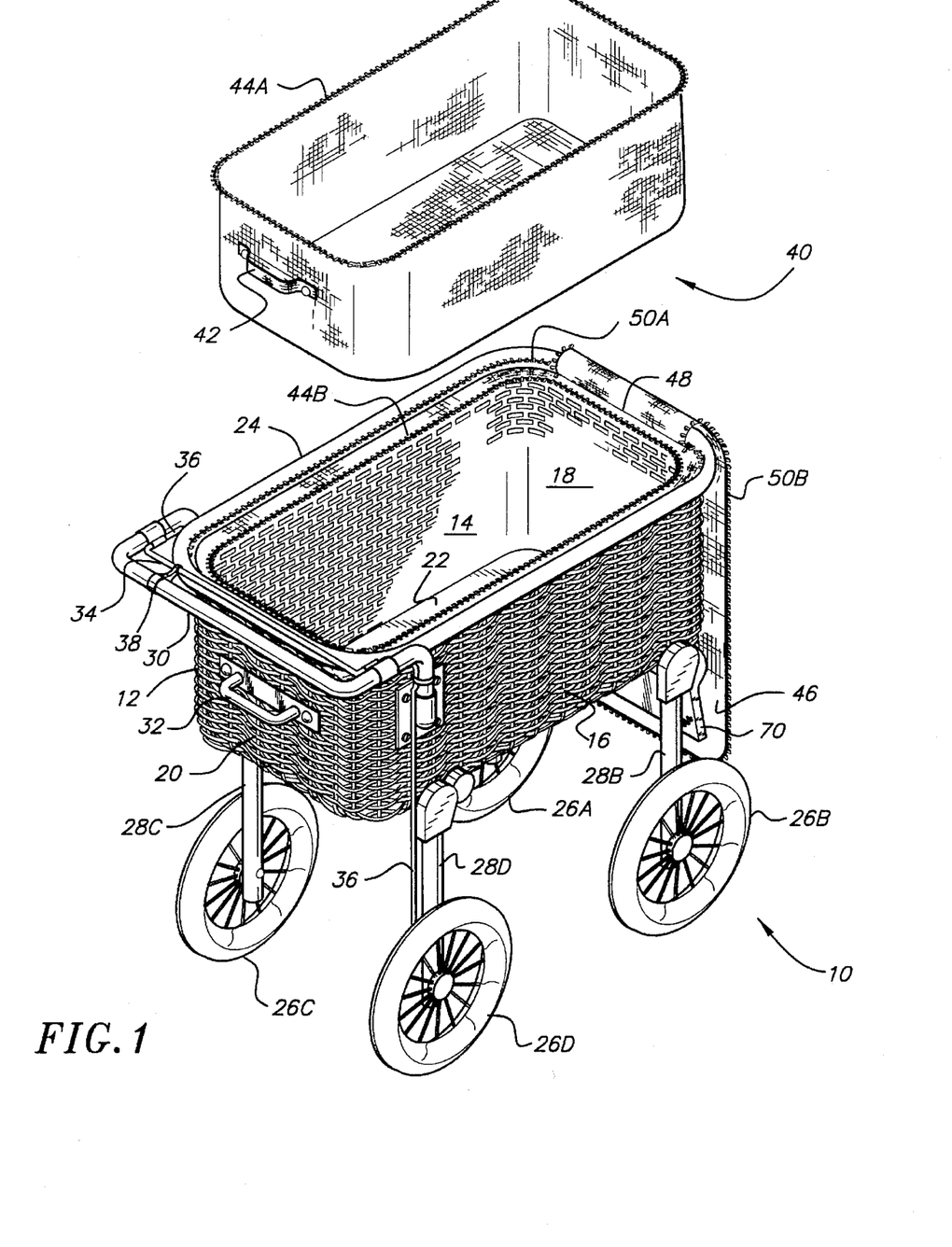
FIG. 1 is a perspective view of the present utility cart, also showing a removable inner liner separated therefrom.

The present invention comprises a utility cart 10, shown generally in FIG. 1 of the drawings and indicated by the reference numeral 10. The cart 10 includes a generally rectangular container portion 12, having a first and an opposite second lateral wall 14 and 16, a front wall 18, a rear wall 20, a floor 22, and an upper periphery 24 defining a closable open top portion which opens into the interior. The container portion 12 is preferably formed as a somewhat rigid structure of molded plastic or other suitable material, such as woven metal wire or the like. The container portion 12 may be provided with a woven finish or texture, to resemble a large picnic basket or the like, as indicated in the drawing figures. Preferably, the container portion 12 is porous, as indicated by the porous internal walls, in order to allow the container to "breathe" so as not to trap moisture therein.

The container portion 12 of the cart 10 is provided with four relatively large diameter wheels 26a through 26d, similar to those provided with jogging strollers or the like. Such wheels 26 may have a diameter of around ten or twelve inches, more or less, and permit the present cart 10 to be moved easily over soft, rough, and/or uneven terrain, unlike the small diameter casters commonly used on shopping carts and the like. This is an important consideration, as the present cart 10, due to the versatility provided by other features, is not limited to the hard and smooth surfaces provided by supermarket floors and parking lots for shopping carts.

Figure 2:
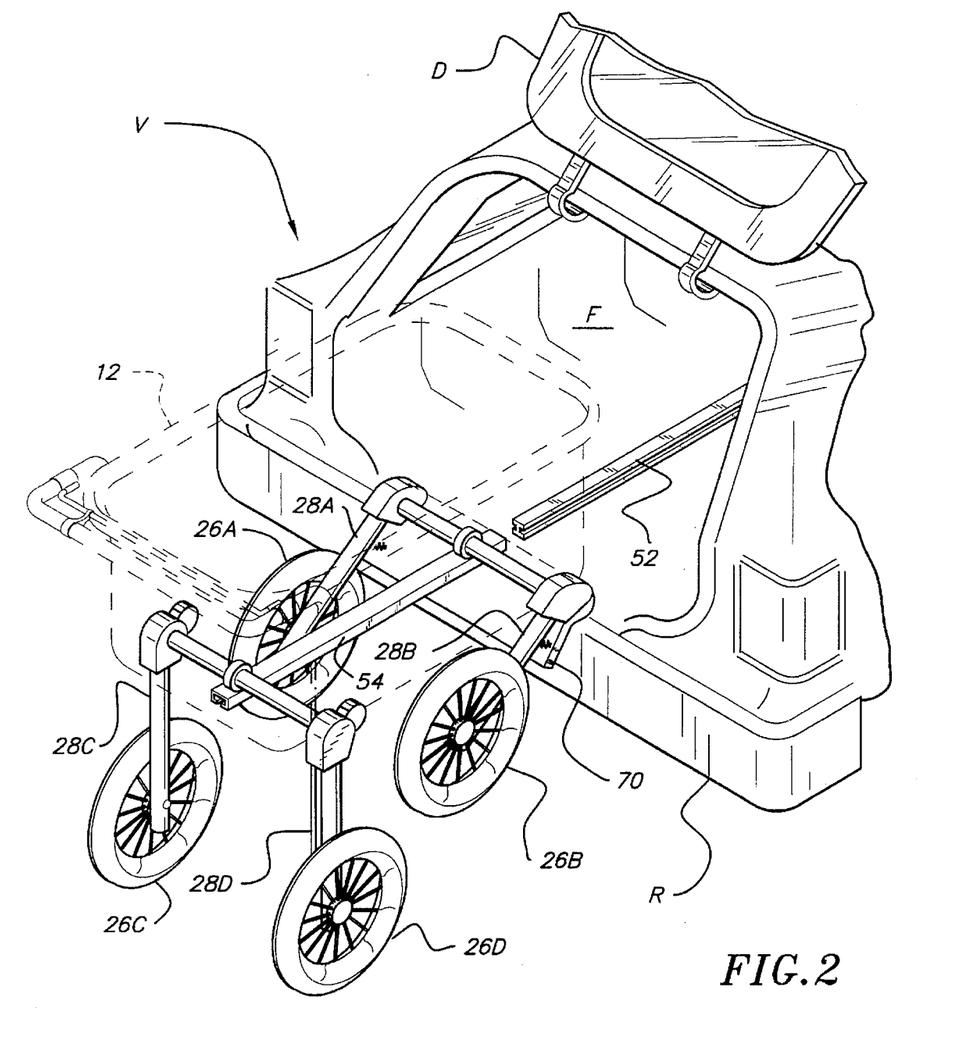
FIG. 2 is a perspective view of the cooperative track and wheel retraction means for the present cart, enabling it to be loaded into the rear of a motor vehicle.
Figure 4:
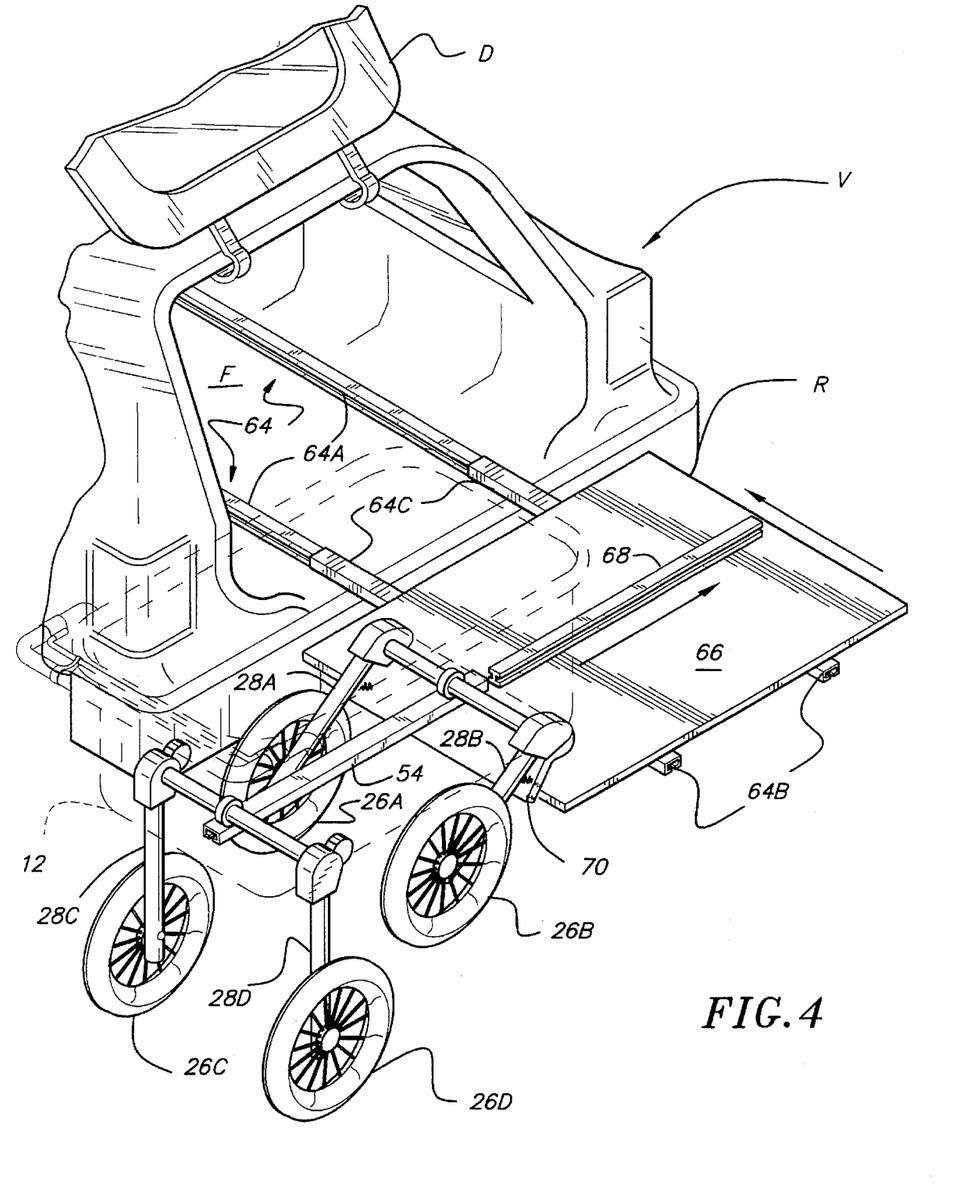
FIG. 4 is a perspective view of an alternate vehicle loading means for the present cart, comprising a vehicle floor platform with a lateral track thereon, permitting the cart to be loaded laterally aboard the vehicle.

The first and second lateral walls 14 and 16 each have a forward and a rearward wheel strut 28 extending therefrom and adjacent the forward and rearward ends of the walls 14 and 16, to provide a left front strut 28a (shown in FIGS. 2 and 4), right front strut 28b, left rear strut 28c, and right rear strut 28d, corresponding to the positions of the wheels 26a through 26d. These struts 28 are pivotally secured to the container portion 12 of the cart 10, and additional mechanism provides for the automatic and progressive retraction of the front wheels and struts 26a, 26b, 28a, and 28b, and rear wheels and struts 26c, 26d, 28c, and 28d, when the cart 10 is loaded aboard a vehicle, as shown in FIGS. 2 and 4 and described further below.

The cart 10 also includes a laterally disposed handlebar 30, extending rearwardly past the rear wall 20 to enable a user of the cart 10 to push or pull the cart 10 forwardly or rearwardly as desired. A supplementary carrying handle 32 may be provided, extending from each end 18 and 20 of the container portion 12. (While only the rear carrying handle 30 is shown, it will be understood that the configuration of the two end walls 18 and 20, and their handles 30, are identical.)

The present cart 10 is preferably provided with brakes for least the two rear wheels 26c and 26d, with brake actuation being provided by a brake lever bar 34 adjacent the lateral handlebar 30. The brake bar 34 may be pulled rearwardly, toward the handlebar 30, which pulls the brake cables 36 to actuate the brakes. (The brakes themselves are not shown, but may be known, conventional light duty brakes which may be provided on the axles of the two wheels 26c/26d or which may comprise shoes disposed immediately above the wheels 26c/26d to bear against the treads of those wheels when the brake lever bar 34 is actuated.) An additional brake feature of the present utility cart is the locking means which is used to prevent the wheels 26c/26d from turning when the cart 10 is unattended. The brake lock 38 is a catch or clasp which is permanently secured to the lateral handlebar 30, and which has a length just sufficient to catch the brake lever bar 34 and hold the bar 34 in a brakes-on position, when the brake lock 38 is swung over the brake lever bar 34. Thus, the present cart 10 is precluded from rolling when left unattended on a slope, and the relatively high mounting of the brake lever bar 34 and brake catch or lock 38, also precludes operation or release of the brakes by a small child.

The container portion 12 of the present utility cart 10 may also be provided with a removable insert 40, if desired. The insert 40 is preferably formed of a heavy, durable fabric material, such as canvas or a heavy synthetic fabric of some sort. The insert 40 is preferably configured similarly to the interior of the container portion 12 of the cart 10, and may be equipped with fabric handles 42 on each of the identical ends, in a similar manner to the handles 32 of the container portion 12. A continuous zipper or other fastener means 44a may be provided about the upper periphery of the insert 40, with a mating zipper portion or fastener means 44b being provided immediately below the padded upper periphery 24 of the container portion 12.

The above described insert 40 provides for the convenient carriage of goods from one point to another, where the cart 10 may not pass (e.g., narrow doorway, stairs, etc.). The zipper or other mating continuous first and second fastener means about the inner periphery of the container portion 12 and insert 40, provide secure temporary attachment for the insert 40 as desired.

Further security for the contents of the cart 10 may be provided by means of a selectively openable closure flap 46, which may have a permanently attached edge 48 sewn or otherwise secured to the container periphery 24 at the forward wall 18, with a first fastener means 50a (zipper, etc.) secured about the inner edge of the upper periphery 24 of the container portion 12 and extending along the first lateral wall 14, the rear wall 20, and the second lateral wall 16. The flexible closure flap 46 includes a mating second fastener means 50b, which extends along its corresponding first lateral edge, rear edge, and second lateral edge.

The above described closure flap 46 provides some additional security for articles which have been placed within the container portion 12 (or within the removable liner 40, if installed), by concealing them from the sight of others. A lock (not shown) may be provided to secure the fasteners 50a/50b. The flap 46 also serves to keep somewhat cooler any articles placed within the container 12, by precluding direct sunlight and air circulation. This can be most helpful in the transport of frozen or perishable goods from the store, and can also provide additional insulation for a cooler which may be stored within the container 12.

FIG. 2 discloses one of the track means which may be used to secure the present utility cart 10 removably within a motor vehicle V having an openable rear door or gate D, such as the station wagon or sport utility type vehicle V of FIG. 2. A permanent vehicle floor track 52 of suitable cross section (T, I, channel, etc.) is securely anchored longitudinally to the rear floor F of the vehicle V, with a complementary or mating longitudinal cart track 54 being provided beneath the floor 22 of the container portion 12 of the cart 10. The cart 10 may thus be wheeled up to the rear of the vehicle V, with the cart track 54 engaging the vehicle floor track 52, and the cart 10 slid into the rear of the vehicle V once the cart wheels and struts 26 and 28 have been folded, as discussed further below. Roller or ball bearings (not shown) within the tracks 52/54 may be provided to ease the insertion and removal of the cart 10 further, if desired. Locking or latching means, discussed further below, may also be provided to retain the cart 10 longitudinally along the vehicle track 52.

Figure 3:
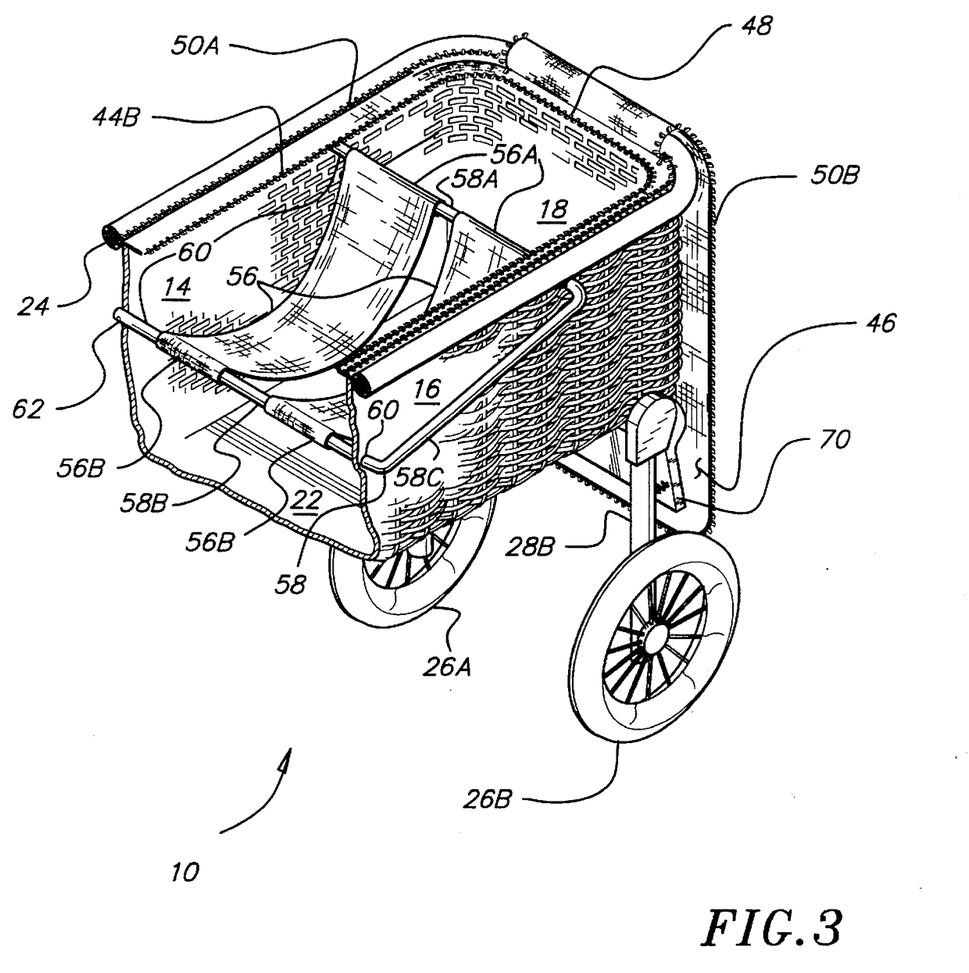
FIG. 3 is a partial perspective view of the present cart, showing removable seating for infants or small children therein.

FIG. 3 shows an optional infant or child seat or seats 56, which may be provided with the container portion 12 of the cart 10. (The present cart 10 may be made in virtually any size, but may be sufficiently wide as to accommodate two sling seats 56, side by side.) A single piece, generally U-shaped support rod 58, having an upper lateral member 58a, a parallel lower lateral member 58b, and a connecting member 58c extending between the upper and lower members 58a and 58b, may be inserted into corresponding passages 60 which pass through the lateral walls 14 and 16 of the container portion 12. The upper and lower members 58a and 58b of the support rod 58 are partially inserted through the container portion 12 by means of the holes 60 in either of the walls 12 or 14, and passed through the corresponding lateral sleeve(s) 56a and 56b positioned respectively along the upper and lower edges of the sling seat(s) 56. A spring loaded retaining ball or pin 62, similar to that provided in the square drive end of a ratchet to retain sockets removably thereon, may be provided to retain the distal end of one or both of the upper and lower members 58a/58b of the support rod member 58. Other retaining means may be provided as desired.

The above described infant or toddler seating is intended for use when the cart 10 is being pushed by hand, or when the cart 10 is at rest on its wheels on a suitable supporting surface. It should be noted that the sling seat(s) 56 do not include any crash protection, seat belt mechanisms, or other safety features, and are not suited to serve as child seats in a moving vehicle. In fact, the generally U-shaped configuration of the support rod member 58, with its crossmember 58c extending laterally from one side of the container portion 12 and the opposite distal ends extending from the opposite side of the container 12, could be positioned to interfere with the retraction of the wheel and strut assemblies 26 and 28, thereby precluding the folding of the wheels and struts to provide for insertion of the cart 10 into a vehicle V. In other words, the support rod 58 for the infant seat(s) 56, must be removed from the cart 10 before wheel and strut retraction can occur, to allow the cart 10 to be placed in a vehicle V.

FIG. 4 shows an alternate insertion and removal of the cart 10 from a vehicle V. Depending upon the dimensions of the cart 10, and the size of the cargo area of the vehicle V (station wagon, minivan, sport utility, etc.) in which the cart 10 is carried, it may be feasible to carry and store the cart 10 laterally in the rear portion of the vehicle V. However, with the longitudinal cart track provided, some additional structure must be provided.

In FIG. 4, the vehicle V is provided with two telescoping parallel longitudinal vehicle floor tracks 64, structurally similar to file cabinet drawer tracks or the like. These tracks 64 include a fixed portion 64a which remains immovably affixed to the vehicle floor F, and a movable portion 64b affixed to an extendible vehicle floor platform 66. Intermediate sections 64c of tracks 64 may be provided for further extension of the platform, as required.

The platform 66 includes a laterally disposed platform track 68 immovably installed thereatop, which is open at each end to provide for the removable installation of the utility cart 10 thereon by means of the cart track 54 beneath the container portion 12. To install the present cart 10 laterally within an appropriately configured vehicle V, the vehicle floor platform 66 is extended from the back of the vehicle V, and the cart 10 is installed on the platform track 68 as described and indicated in FIG. 4. The platform 66 is then rolled or inserted back into the vehicle V. Locking means, described further below, may be provided to anchor the cart 10 to the track 68, and the platform 66 within the vehicle V. Removal is the reverse of installation.

As the present utility cart 10 may have a relatively large size and depth, to provide sufficient volume for the carriage of various articles ranging from groceries to suitcases, etc., it will be seen that the total height of the cart 10, with its wheels 26 and struts 28 extended, may be sufficient to prevent the insertion of the cart 10 within the rear of a vehicle V, particularly such vehicles which are relatively small and compact. Moreover, due to the weight which might be carried in the present cart 10, it might be quite difficult for a single person to lift the cart 10 for placement in the back of a vehicle V. Accordingly, an automatic, progressive wheel and strut retraction system has been developed for the present cart 10, which enables the cart 10 to be pushed to the rear of a vehicle V and which automatically retracts the front and rear wheels and struts progressively as the cart 10 is pushed further into the vehicle V. The cart wheels and struts will also automatically extend as the cart 10 is withdrawn from the vehicle.

Figure 5:
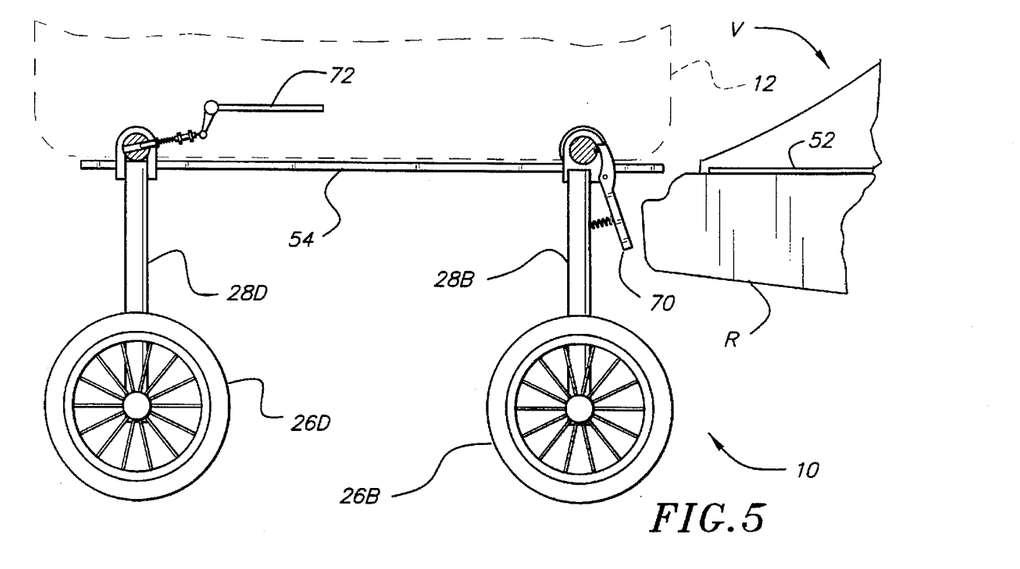
FIGS. 5 through 7 are schematic side elevation views of the progressive wheel retraction system of the present utility cart.
Figure 6:
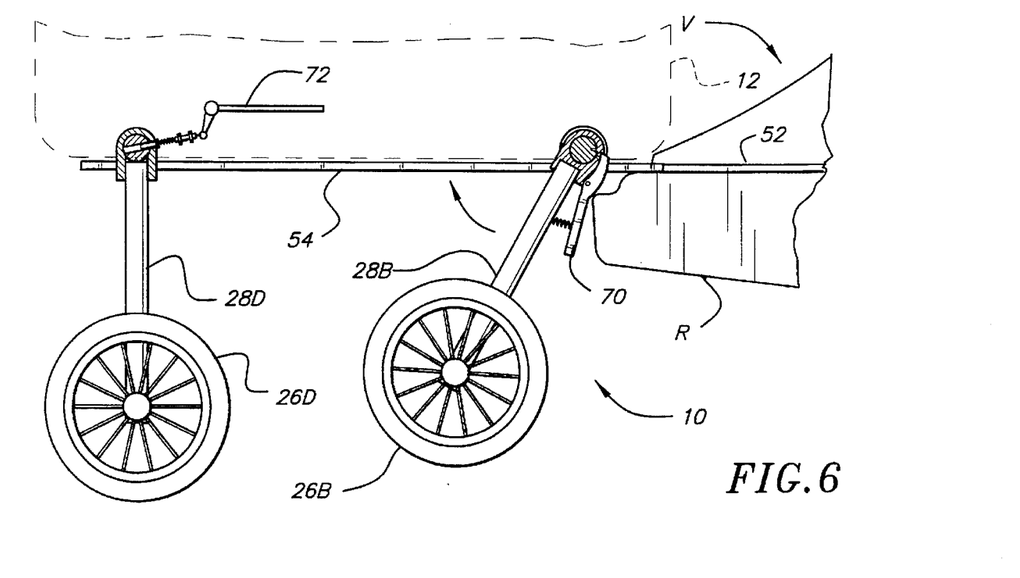
Figure 7:
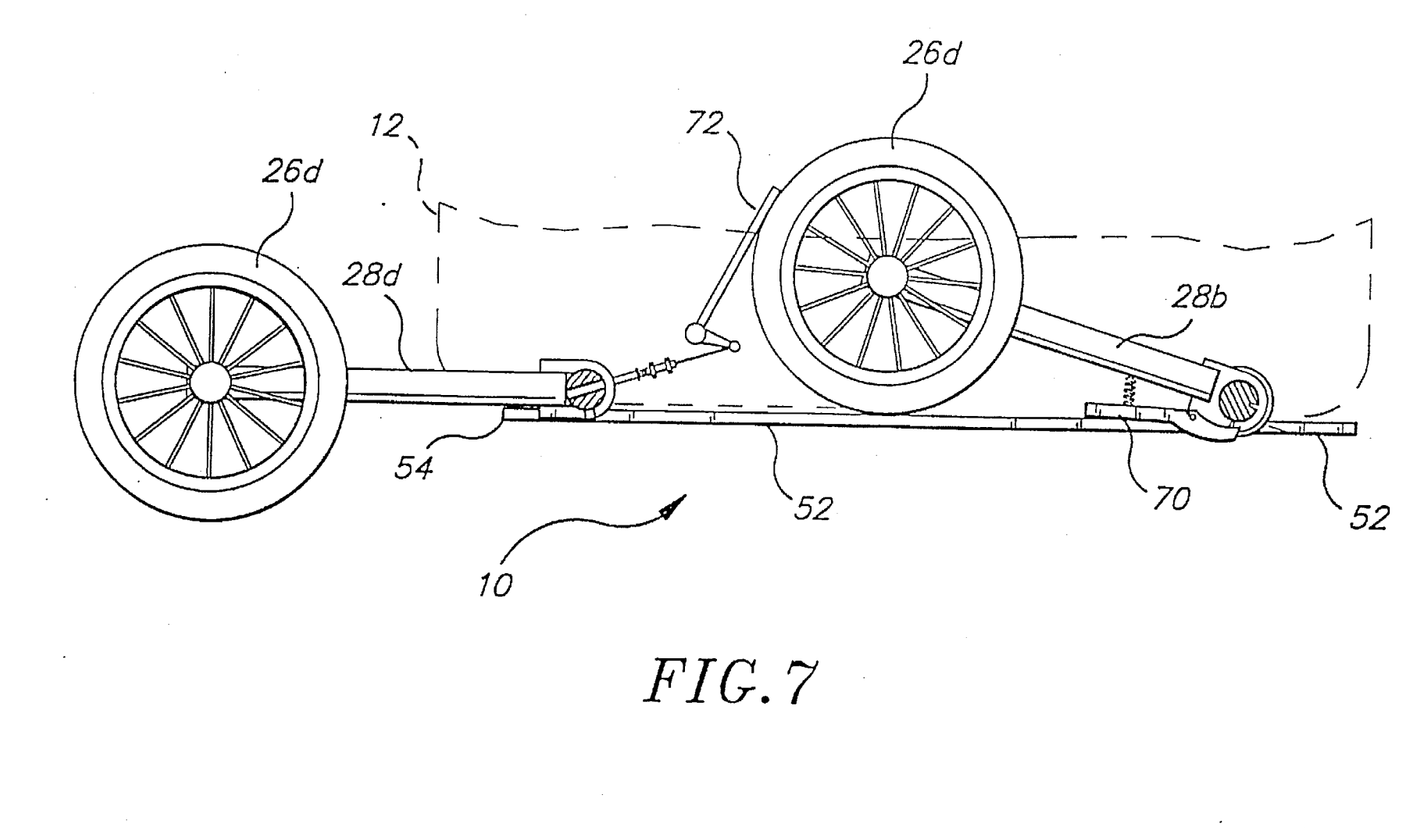

FIGS. 5, 6, and 7 provide schematic side elevation views of the progressive retraction of the front and rear wheels and struts of the present cart 10, as it is loaded aboard a vehicle V. In FIG. 5, the cart 10 has been wheeled to a point immediately adjacent the rear structure R (bumper, rear edge of cargo floor, etc.), with the cart track 54 aligned with the vehicle floor track 52. The cart wheel struts 28 and wheels 26, are normally locked in a downward position below the container portion 12, as shown more clearly in FIGS. 8 and 10, respectively showing the locking and retraction details for the front and rear struts of the cart 10.

A front strut retraction lever 70 is provided at the front of the cart 10, and extends downwardly below the bottom of container portion 12 and its track 54. (Alternatively, a separate lever may be provided for each side of the cart 10.) The lower portion(s) of the lever(s) 70 are positioned to contact and be deflected rearwardly by the rear structure R of the vehicle V, as the cart 10 is pushed into the rear cargo area of the vehicle V. As the lever(s) 70 are deflected, the opposite upper ends act to withdraw pins from the two front strut axles, which operation is more clearly shown in FIGS. 8 and 9 and described in further detail below. This withdrawal of the pin from the front axles frees the two front struts 28a and 28b to pivot about their respective axles, and thus to be pushed rearwardly and upwardly due to contact with the rear structure R of the vehicle V, as shown in FIG. 6.

The rear of the cart 10 also includes a first and an opposite second rear strut retraction lever 72, respectively extending from the first and second lateral walls 14 and 16 of the container portion 12 and positioned forwardly of the rear strut axles 28c/28d extending from each side of the container portion 12. These rear levers 72 (only one of which is visible in the drawings, but it will be understood that cart 10 is laterally symmetrical) serve the same function as the front strut retraction lever(s) 70, and are actuated by contact with the respective front wheel or strut, e.g., wheel 26b, as shown in FIG. 7. Continued forward motion of the cart 10, results in the rear wheels and struts folding rearwardly, to allow the cart 10 to be inserted completely into the vehicle V.

Figure 8:
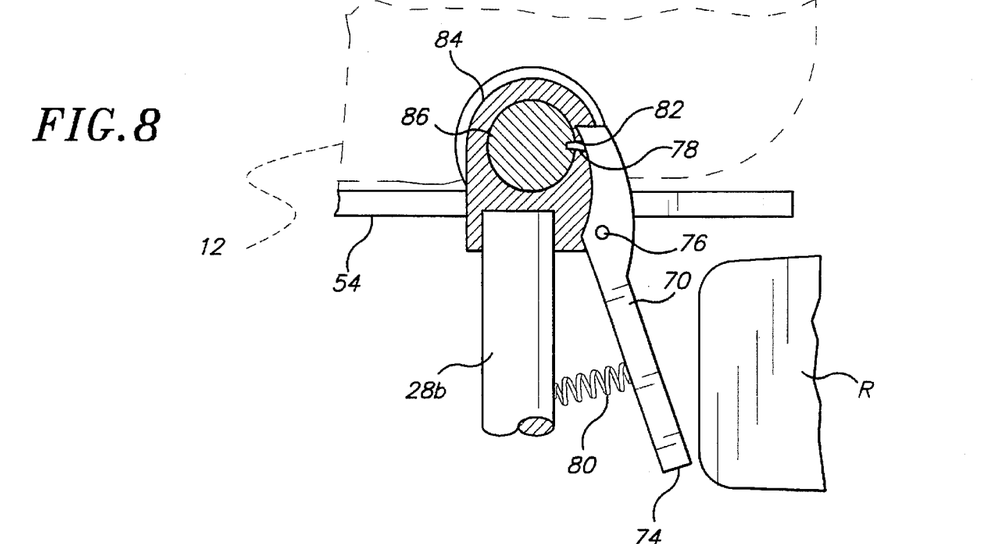
FIGS. 8 and 9 are detailed schematic side elevation views of the front wheel and strut retraction mechanism, showing its operation.
Figure 9:
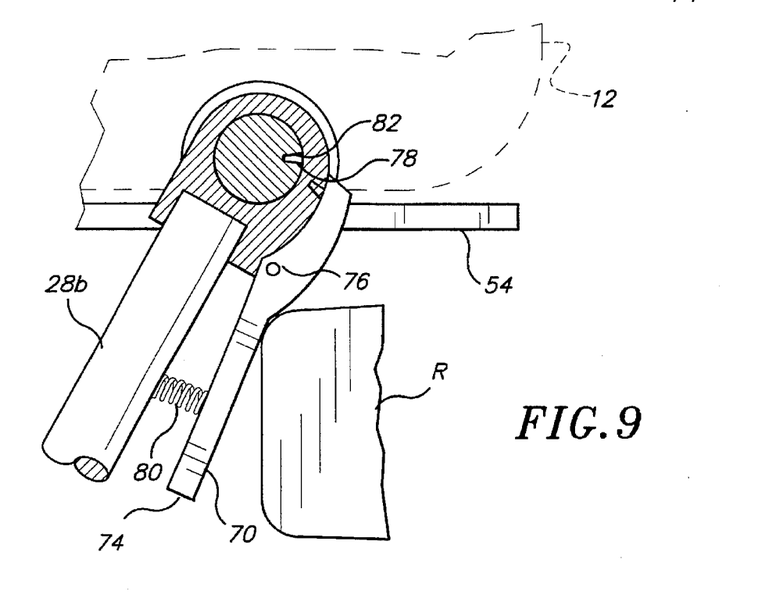

FIGS. 8 and 9 disclose detailed views of the downwardly locked (FIG. 8) and partially retracted (FIG. 9) positions of a front strut 28b, with it being understood that the arrangement of the opposite front strut 26a is a mirror image of that shown in FIGS. 8 and 9. In FIG. 8, the distal end 74 of the lever 70 is about to contact the rear structure R of the vehicle V, but has not yet made contact. The lever 70 is secured to a pivot 76, with a locking end and pin 78 being disposed opposite the distal end 76 of the lever 70. A spring 80 may be provided between the strut 28b and the lever 70, serving to urge the pin 78 into a mating passage 82 through the axle end 84 of the strut 28b and its corresponding axle 86. Thus, when the lower or distal end 76 of the lever 70 is deflected rearwardly by the rear structure R of the vehicle V as the cart 10 is pushed into the cargo area of the vehicle V, the opposite pin 78 will be withdrawn from the passage 82 at least in the axle 86, thereby allowing the entire lever 70, strut 28b (and its wheel 26b), and strut axle end 84 assembly to pivot rearwardly and upwardly as the assembly contacts the rear structure R of the vehicle V, as shown in detail in FIG. 9.

Figure 10:
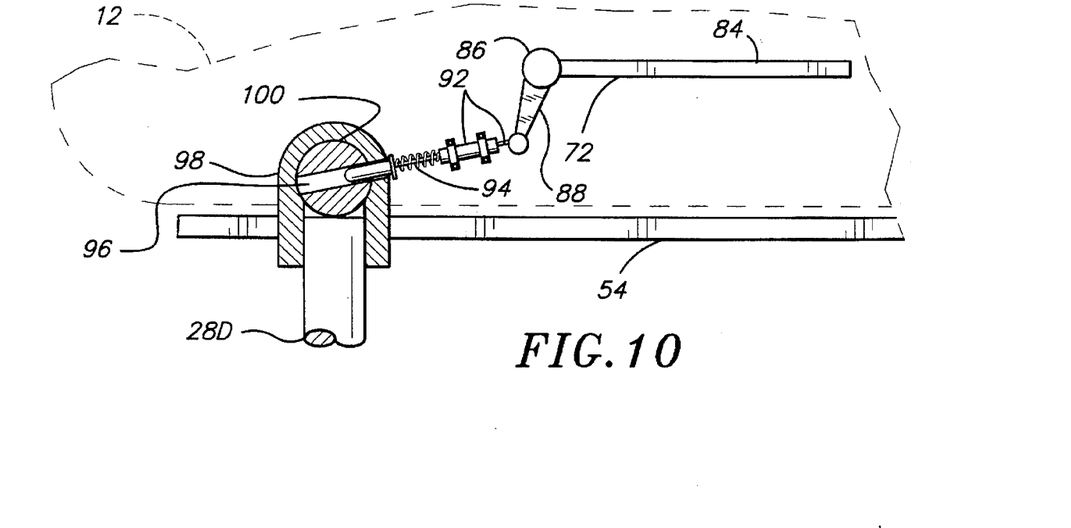
FIGS. 10 and 11 are detailed schematic side elevation views of the rear wheel and strut retraction mechanism, showing its operation.
Figure 11:
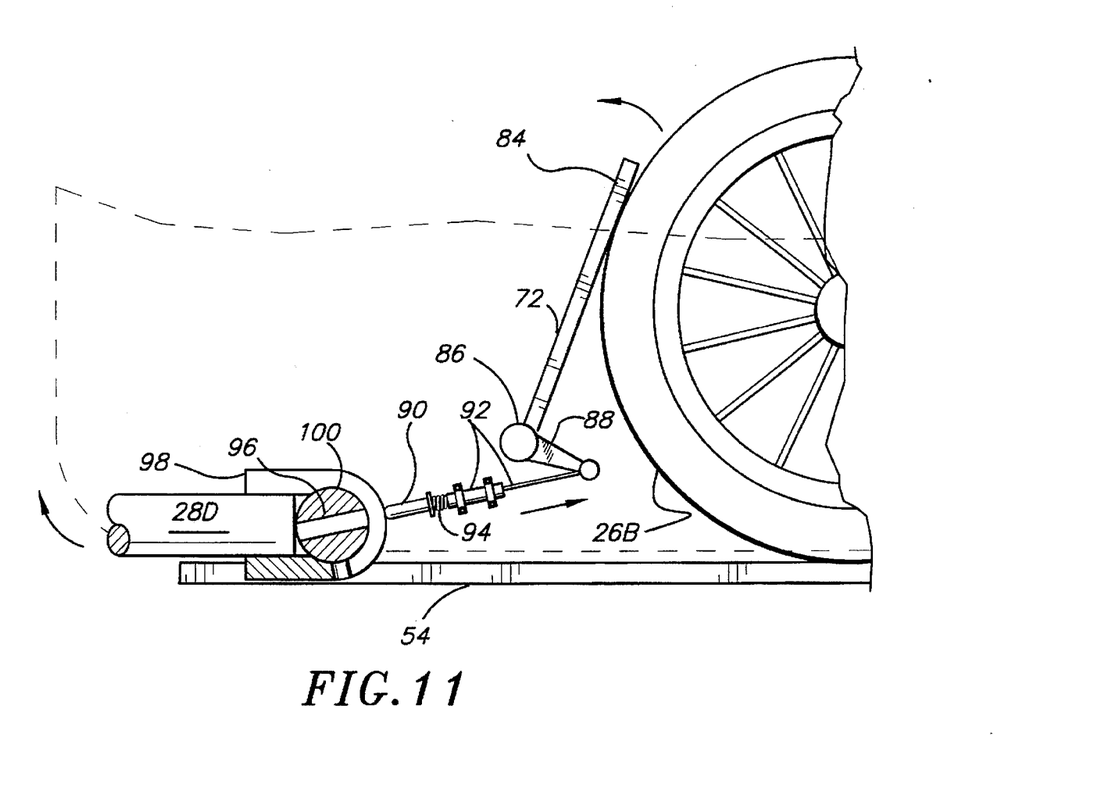

FIGS. 10 and 11 disclose a similar retraction arrangement for the rear wheel and strut assembly, e.g., wheel 26d and strut 28d, as the lever 72 is actuated by the retracting front wheel 26b. In the case of the rear strut retraction levers 72, some additional linkage may be provided, depending upon the distance between the front wheel 26b and the rear strut 28d. Also, the lever 72 is deflected upwardly, rather than rearwardly as is the front lever 70.

Accordingly, the lever 72 includes a distal end 84, opposite a pivot 86. A retraction arm 88 extends from the pivot 86. This retraction arm 88 is connected to a rear strut lock pin 90, either directly or by means of a tension cable and housing 92. A rear pin engagement spring 94 serves to retain the pin 90 within a rear strut pin passage 96, formed through the rear strut axle end 98 and rear strut axle 100. As the retracting front axle 28b approaches a nearly horizontal position, its wheel 26b will contact the rear retraction lever 72, raising it and thus causing the linkage to withdraw the rear strut lock pin 90 from the rear strut axle passage 96. This leaves the assembly comprising the rear wheel 26d, rear axle 28d, and rear strut axle end 98, free to pivot about the rear strut axle 100, whereupon the assembly will be pushed rearwardly and upwardly as it contacts the rear structure of the vehicle, as the cart 10 is pushed further into the vehicle, as shown in FIG. 7.

Withdrawing the cart 10 from the vehicle allows the front and rear wheels and struts 26 and 28 to fall freely to a substantially vertical orientation below the container portion 12 of the cart 10, depending from their respective strut axles. This allows the spring loaded front and rear pins 78 and 90 to be pushed into their respective passages 82 and 96 by their springs 80 and 94, thus locking the axles 28 in a downward position below the container portion 12 of the cart 10.

It will be seen that different linkages may be provided, so long as the progressive retraction and extension means is achieved, whereby the rear of the cart 10 is supported by the extended rear wheels, with the front of the cart 10 partially inserted within the vehicle. This is of great assistance to persons using the present utility cart 10 to carry heavy loads, particularly elderly persons and/or those who have physical difficulty in handling or supporting heavy loads. The present cart 10, or the vehicle V serving to support the cart 10 with its wheels in a partially or completely retracted condition, will always support the substantial majority of any load carried in the cart 10, as by the time the rear wheels begin to retract due to the progressive retraction provided, the cart 10 will be engaged with the vehicle floor track 54 or platform track 68, with the center of the cart 10 being positioned over the supporting vehicle floor or platform, as the case may be.

When the cart 10 is withdrawn from the vehicle, the rear wheels will fall free first, dropping to a down and locked position while the majority of the cart 10 is still supported by the vehicle. As the cart 10 is further withdrawn, the front wheels will progressively fall into a down and locked position, to support the cart 10 as it is removed from its engagement with the vehicle track 54 or platform track 68. Thus, no appreciable physical lifting need be performed to load and unload the present cart 10 into and from a vehicle. It will also be seen that the present cart may be used with a van or the like with side doors, and loaded laterally therein, using much the same apparatus.

Figure 12:
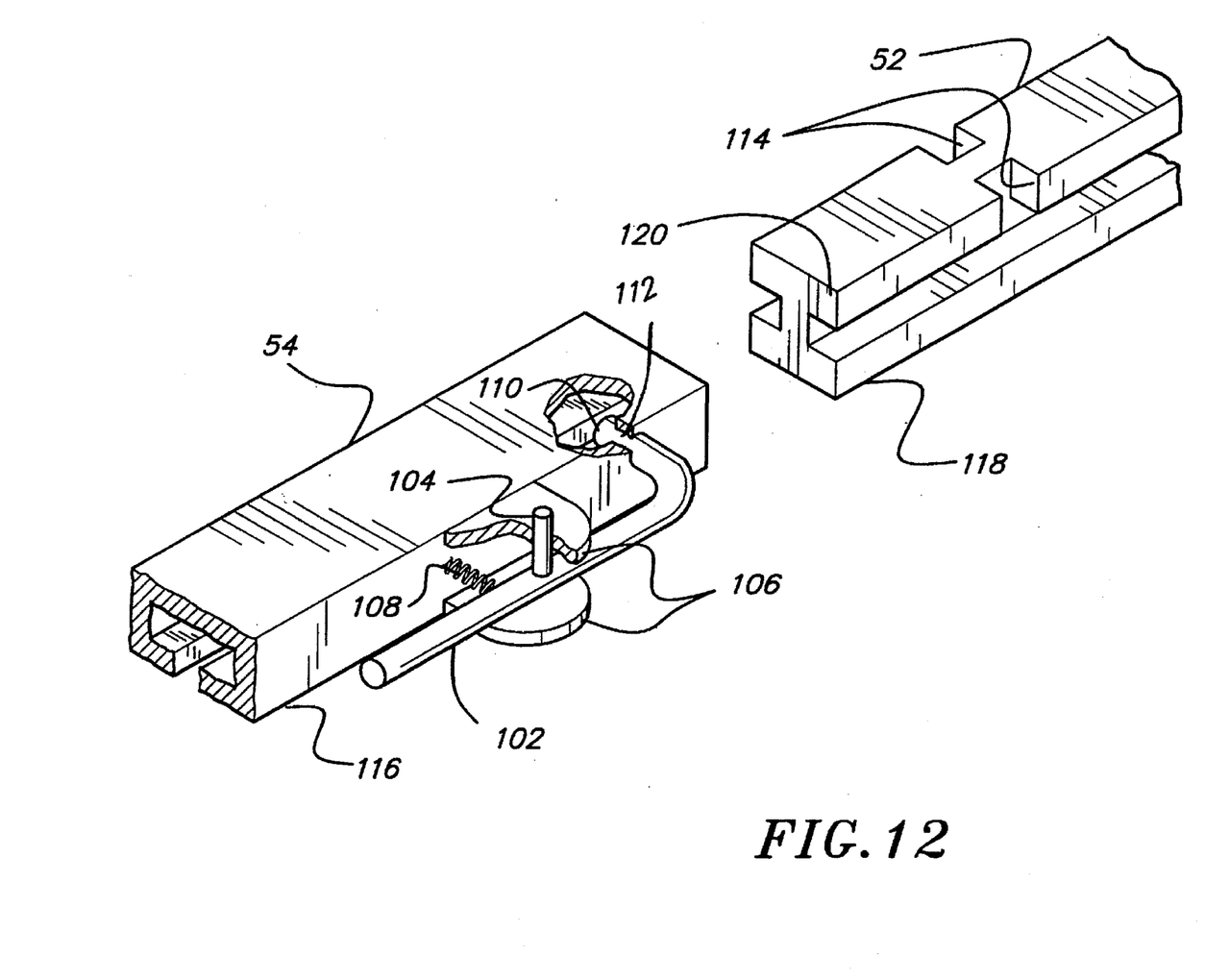
FIG. 12 is a detailed exploded perspective view of the locking means serving to secure the present cart and its track to the track within a motor vehicle.

The track mechanism provided for the cart 10 within the vehicle V, serves to retain the cart 10 from motion laterally or vertically relative to the vehicle floor track 52 or platform track 68, due to the cooperating channel and T- or I-section track provided. However, further locking means must be provided to preclude longitudinal movement of the cart 10 along the length of any track 52 or 68 affixed within the vehicle V. Such a locking means is shown in FIG. 12 of the drawings. The track 52 which is affixed to the rear cargo area of the vehicle may comprise an I-section, as shown in solid lines, or a T-section with the lower flanges removed, as shown by the lower broken lines. A complementary, mating inverted channel with inward extensions engaging the narrow portion of the vehicle track 52, serves as the cart track 54. (It will be noted that these two components may be inverted relative to one another, with the channel configuration serving as the vehicle track and the I- or T-section serving as the cart track. However, the inversion of the channel and its use beneath the cart 10, serves to reduce the collection of debris within the channel.)

The locking means used to secure the cart 10 longitudinally along the vehicle track 52, comprises a locking lever 102 which is pivotally affixed to the side of the cart track 54 by a pin 104 and ears or lugs 106. A lock lever spring 108 is used to urge the beveled locking pin end 110 of the lever 102 into a lateral hole 112 formed through the side of the cart track 54 channel. A mating relief 114 is formed in one or both sides of the vehicle track 52.

Preferably, the locking assembly of the cart track 54, and the reliefs 114 provided in the vehicle track 52, are installed near their respective rearward ends 116 and 118. In this way, the lever handle 102 will be easily accessible adjacent the rear entrance to the vehicle, where it may be operated to unlock the cart track 54 from the vehicle track 52 for removal of the cart from the vehicle. The above described locking means is also equally applicable to a laterally installed cart 10, using the vehicle floor platform 66 arrangement of FIG. 4. The lateral platform track 68 need only have reliefs similar to the reliefs 114 of the track 52 of FIG. 12 formed at both ends thereof, to allow the cart 10 to be installed on the lateral track 68 from either end, as desired.

When the cart 10 is placed within the vehicle V by engaging the cart track 54 with the vehicle track 52, the beveled end 110 of the locking lever 102 will first contact the upper flange end 120 of the vehicle track 52. The beveled end will slip over the upper flange end, and will be pushed outwardly as it rides along the outer surface of the upper flange of the track 52. When the cart 10 reaches its installed position along the vehicle track 52, the lock lever end 110 will be forced into one of the reliefs 114 of the vehicle track 52, with the pressure of the spring 108 creating sufficient force to provide a "click" or "snap" to alert the installer that the locking means has been positively engaged. The cart 10 may be easily unlocked from the track 52, merely by pushing the handle 102 toward the cart track 54 to withdraw the pin end 110 from the relief 114, and withdrawing the cart 10 from the vehicle.

In summary, the above described utility cart 10, and its associated vehicle attachment means, will be seen to provide a most useful accessory for owners and operators of appropriately configured vehicles, such as station wagons, minivans and other van type vehicles, and sport utility vehicles. The present cart 10 enables a person to go shopping with the cart secured in the back of the vehicle, and to remove the cart from the vehicle to provide a personal shopping cart for such activities. The progressively retractable and extendible wheels and struts, along with the track means used to secure the cart within the vehicle, serve to provide support for the cart at virtually all times. The infant or toddler seating which may be installed, provides further utility. When the errand has been completed, the loaded cart may be wheeled easily across most urban terrain (small curbs, etc.) by means of the large diameter wheels provided.

As the cart is loaded into the vehicle and the cart track engages the vehicle or platform track, the front retraction lever(s) will release the front wheels from their locked and extended position, allowing them to be pushed rearwardly and upwardly as they contact the structure of the vehicle. Meanwhile, the rear wheels will still be extended, and will serve to provide support for the rear of the cart. As the front wheels and struts continue to be pushed rearwardly as the cart is pushed further into the vehicle, they will contact the rear wheel strut locking levers, whereupon those struts will be unlocked to allow the cart to be completely inserted into the vehicle, and locked in place.

When the destination has been reached, the cart may be removed from the vehicle by unlocking the track locking lever, and withdrawing the cart from the vehicle. The rear wheels will first fall downward and lock into place (some manual assistance may easily be provided as needed), with the majority of the cart being supported by the vehicle or platform track. As the cart continues to be withdrawn from the vehicle, the rear portion will be supported by the now extended rear wheels. The front wheels will finally drop into an extended and locked position to support the front of the cart, just before the cart is disengaged from the vehicle track.

At this point, the cart may be wheeled across the yard or other area as desired, to the door of the residence or structure. The inner liner, if used, may be used to carry articles from the cart and into the home, or the cart may be used to wheel the articles into the home, depending upon the character of the entrance. The cart may be stored within the vehicle if so desired, where it will always be ready for use and will serve to retain loose articles therein to preclude their movement within the vehicle.

The basket like preferred finish of the container portion of the cart will be seen to provide a most attractive configuration for picnics and other similar gatherings, with the closable top providing protection for articles placed therein. The various handles provided allow a user of the present utility cart to carry and move the cart and its contents as desired.

The padding of the upper periphery of the present utility cart provides an additional degree of safety for users of the cart, as well as others. Such padding is especially valuable when infants or small children are carried within the container portion in the optional seating disclosed herein, to preclude inadvertent injury from contact with the periphery. Additional features, such as reflective tape or other reflective means (not shown), may be added to the wheel hubs, wheel struts, handles, upper periphery, and/or other areas of the cart as desired, to provide additional safety and security for a user at night or in conditions of poor visibility or low light. Accordingly, the present cart 10 will serve as a most valuable accessory for appropriately configured vehicles, serving to increase their versatility to a considerable degree.

It is to be understood that the present invention is not limited to the sole embodiment described above, but encompasses any and all embodiments within the scope of the following claims.

I claim:

1. A utility cart including means providing for the removable anchoring of said cart in a motor vehicle, said utility cart and anchoring means comprising:

a cart having a rigid container portion with a generally rectangular configuration, with a first and an opposite second lateral wall, a front wall, a rear wall, a floor, and an open top and interior;

said first and said second lateral wall each respectively having a front and a rear wheel strut pivotally secured thereto, with each said wheel strut having a large diameter wheel installed thereon and being automatically lockable in a downwardly extended position and automatically pivotable to an upwardly retracted position to provide for the automatic folding and retraction of each said wheel strut and wheel;

said cart further including a laterally disposed handlebar extending rearwardly past said rear wall adjacent said open top, and at least a forward and rear handle extending respectively from said front wall and said rear wall, and;

said floor of said cart further including a longitudinal cart track centered therebelow, with said track being adapted to engage at least one mating vehicle floor track installed within the motor vehicle and with said cart track and said vehicle floor track including locking means providing for the selective locking of said cart immovably within the motor vehicle as desired.

2. The utility cart according to claim 1 including:

progressive wheel strut retraction means, comprising;

at least one front strut retraction lever communicating with each said front wheel strut to release each said front wheel strut from a locked and extended position when said front lever is actuated by contact with the motor vehicle structure as said cart is loaded aboard the vehicle, with each said front wheel strut being pivoted upwardly and rearwardly by the vehicle structure as said cart is further inserted into the vehicle, and;

a first and a second rear strut retraction lever positioned to be actuated by a respective front wheel as each said front wheel strut is pivoted upwardly and rearwardly, with each said rear strut retraction lever communicating respectively with each said rear wheel strut to release each said rear wheel strut from a locked and extended position and with each said rear wheel strut being pivoted upwardly and rearwardly by the vehicle structure as said cart is even further inserted into the vehicle.

3. The utility cart according to claim 1 including:

lateral cart insertion means, comprising;

a selectively extendible vehicle floor platform, secured to the vehicle floor by at least one longitudinal platform track disposed beneath said platform and engaging said mating vehicle floor track within the vehicle, and;

said vehicle floor platform further including a lateral platform track disposed thereatop, with said lateral platform track being adapted to engage said cart track when said vehicle floor platform is extended from the vehicle, and said cart is secured to said vehicle floor platform by positioning said cart laterally relative to said platform and installing said cart atop said platform by engaging said cart track with said lateral platform track, with said cart then being laterally inserted into the vehicle by retracting said vehicle floor platform into the vehicle along said vehicle floor track.

4. The utility cart according to claim 1, including:

Brake means selectively operable for at least said wheel of each said rear wheel strut of said cart, with said brake means being selectively actuated by a brake actuation lever adjacent said handlebar, and;

brake locking means serving to hold said brake means in an actuated condition as desired.

5. The utility cart according to claim 1, including:

a removably attachable internal liner for said container portion, with said container portion including an upper periphery having a continuous first fastener disposed therearound and said internal liner including an upper periphery having a continuous second fastener disposed therearound and adapted to selectively engage said first fastener of said container portion of said cart.

6. The utility cart according to claim 1, including:

an openable closure for said container portion, with said container portion including an upper periphery having a first fastener disposed continuously along said first lateral wall, said rear wall, and said second lateral wall, with said closure comprising a flexible flap of material having a corresponding first lateral edge, rear edge, and second lateral edge, with each said edge having a second fastener disposed continuously therealong and adapted to selectively engage said first fastener of said container portion of said cart, with said closure further having a front edge permanently secured to said front wall of said container portion of said cart.

7. The utility cart according to claim 1, including:

child seating means removably installable therein, comprising at least one sling seat having an upper portion and a lower portion each engaging lateral support means, with said lateral support means comprising a generally U-shaped rod having an upper member engaging said upper portion of said seat and a lower member engaging said lower portion of said seat, with said upper member and said lower member having a connecting member therebetween, and;

said container portion including first and second upper rod passages and first and second lower rod passages formed respectively through said first and second lateral walls, with said lateral support means being selectively inserted through said rod passages and engaging said at least one sling seat to provide support thereto within said container portion of said cart.

8. The utility cart according to claim 1, including:

a padded upper periphery disposed about said container portion.

9. The utility cart according to claim 1, wherein:

said container portion of said cart is formed in a porous, open weave pattern.

10. The utility cart according to claim 1, wherein:

said container portion of said cart is formed of materials selected from the group consisting of plastics and metal wire.

11. A motor vehicle and utility cart, comprising in combination:

a motor vehicle having a rear structure including a rear door and rear floor with at least one vehicle floor track installed generally longitudinally therein;

a utility cart having a rigid container portion with a generally rectangular configuration, with a first and an opposite second lateral wall, a front wall, a rear wall, a floor, and an open top and interior;

said first and said second lateral wall of said container portion of said cart each respectively having a front and a rear wheel strut pivotally secured thereto, with each said wheel strut having a large diameter wheel installed thereon and being automatically lockable in a downwardly extended position and automatically pivotable to an upwardly retracted position to provide for the automatic folding and retraction of each said wheel strut and wheel of said cart;

said cart further including a laterally disposed handlebar extending rearwardly past said rear wall adjacent said open top, and at least a forward and rear handle extending respectively from said front wall and said rear wall, and;

said floor of said cart further including a longitudinal cart track centered therebelow, with said track being adapted to engage said vehicle floor track of said motor vehicle and with said cart track and said vehicle floor track including locking means providing for the selective locking of said cart immovably within said motor vehicle as desired.

12. The motor vehicle and utility cart combination according to claim 11, including:

progressive wheel strut retraction means for said cart, comprising;

at least one front strut retraction lever communicating with each said front wheel strut to release each said front wheel strut from a locked and extended position when said front lever is actuated by contact with said rear structure of said vehicle as said cart is loaded aboard said vehicle, with each said front wheel strut being pivoted upwardly and rearwardly by said rear structure of said vehicle as said cart is further inserted into said vehicle, and;

a first and a second rear strut retraction lever positioned to be actuated by a respective front wheel as each said front wheel strut is pivoted upwardly and rearwardly, with each said rear strut retraction lever communicating respectively with each said rear wheel strut to release each said rear wheel strut from a locked and extended position and with each said rear wheel strut being pivoted upwardly and rearwardly by said rear structure of said vehicle as said cart is even further inserted into said vehicle.

13. The motor vehicle and utility cart combination according to claim 11, including:

lateral cart insertion means, comprising;

a selectively extendible vehicle floor platform, secured to said floor of said vehicle by at least one longitudinal platform track disposed beneath said platform and engaging said at least one vehicle floor track within said vehicle, and;

said vehicle floor platform further including a lateral platform track disposed thereatop, with said lateral platform track being adapted to engage said cart track when said vehicle floor platform is extended from said vehicle, and said cart is secured said vehicle floor platform by positioning said cart laterally relative to said platform and installing said cart atop said platform by engaging said cart track with said lateral platform track, with said cart then being laterally inserted into said vehicle by retracting said vehicle floor platform into said vehicle along said vehicle floor track.

14. The motor vehicle and utility cart combination according to claim 11, including:

Brake means selectively operable for at least said wheel of each said rear wheel strut of said cart, with said brake means being selectively actuated by a brake actuation lever adjacent said handlebar of said cart, and;

brake locking means serving to hold said brake means of said cart in an actuated condition as desired.

15. The motor vehicle and utility cart combination according to claim 11, including:

a removably attachable internal liner for said container portion of said cart, with said container portion including an upper periphery having a continuous first fastener disposed therearound and said internal liner including an upper periphery having a continuous second fastener disposed therearound and adapted to selectively engage said first fastener of said container portion of said cart.

16. The motor vehicle and utility cart combination according to claim 11, including:

an openable closure for said container portion of said cart, with said container portion including an upper periphery having a first fastener disposed continuously along said first lateral wall, said rear wall, and said second lateral wall, with said closure comprising a flexible flap of material having a corresponding first lateral edge, rear edge, and second lateral edge, with each said edge having a second fastener disposed continuously therealong and adapted to selectively engage said first fastener of said container portion of said cart, with said closure further having a front edge permanently secured to said front wall of said container portion of said cart.

17. The motor vehicle and utility cart combination according to claim 11, including:

child seating means removably installable within said cart, comprising at least one sling seat having an upper portion and a lower portion each engaging lateral support means, with said lateral support means comprising a generally U-shaped rod having an upper member engaging said upper portion of said seat and a lower member engaging said lower portion of said seat, with said upper member and said lower member having a connecting member therebetween, and;

said container portion of said cart including first and second upper rod passages and first and second lower rod passages formed respectively through said first and second lateral walls, with said lateral support means being selectively inserted through said rod passages and engaging said at least one sling seat to provide support thereto within said container portion of said cart.

18. The motor vehicle and utility cart combination according to claim 11, including:

a padded upper periphery disposed about said container portion of said cart.

19. The motor vehicle and utility cart combination according to claim 11, wherein:

said container portion of said cart is formed in a porous, open weave pattern.

20. The motor vehicle and utility cart combination according to claim 11, wherein:

said container portion of said cart is formed of materials selected from the group consisting of plastics and metal wire.

\* \* \* \* \*